US011113156B2

(12) United States Patent
Brewer et al.

(10) Patent No.: US 11,113,156 B2
(45) Date of Patent: Sep. 7, 2021

(54) AUTOMATED RANSOMWARE IDENTIFICATION AND RECOVERY

(71) Applicant: KASEYA US LLC, Miami, FL (US)

(72) Inventors: Karl Edward Brewer, Columbia, SC (US); Oscar Rudolph McNeese, Jr., Pomaria, SC (US); Sameer Prakash Kamat, Columbia, SC (US)

(73) Assignee: KASEYA US LLC, Miami, FL (US)

( * ) Notice: Subject to any disclaimer, the term of this patent is extended or adjusted under 35 U.S.C. 154(b) by 67 days.

(21) Appl. No.: 16/245,114

(22) Filed: Jan. 10, 2019

(65) Prior Publication Data

US 2019/0235973 A1 Aug. 1, 2019

Related U.S. Application Data

(60) Provisional application No. 62/615,717, filed on Jan. 10, 2018.

(51) Int. Cl.
*G06F 21/00* (2013.01)
*G06F 11/14* (2006.01)
*G06F 21/56* (2013.01)

(52) U.S. Cl.
CPC ........ *G06F 11/1469* (2013.01); *G06F 21/568* (2013.01); *G06F 2201/84* (2013.01); *G06F 2221/034* (2013.01)

(58) Field of Classification Search
CPC ............. G06F 11/1469; G06F 11/1471; G06F 11/2023; G06F 11/2097; G06F 21/568; G06F 2201/815; G06F 2201/84; G06F 2221/034
See application file for complete search history.

(56) References Cited

U.S. PATENT DOCUMENTS

| 9,098,525 | B1 * | 8/2015 | Mandic | G06F 16/182 |
| 2006/0150013 | A1 * | 7/2006 | Augenstein | G06F 11/1448 |
| | | | | 714/15 |
| 2014/0310246 | A1 * | 10/2014 | Vijayan | G06F 11/1464 |
| | | | | 707/679 |
| 2015/0254088 | A1 * | 9/2015 | Chou | G06F 3/067 |
| | | | | 709/212 |
| 2016/0110262 | A1 * | 4/2016 | Nanivadekar | G06F 13/4282 |
| | | | | 707/654 |
| 2017/0177443 | A1 * | 6/2017 | Figueroa | G06F 11/1464 |
| 2019/0042744 | A1 * | 2/2019 | Rajasekharan | G06F 21/554 |
| 2019/0109870 | A1 * | 4/2019 | Bedhapudi | H04L 63/0428 |

* cited by examiner

*Primary Examiner* — Joseph P Hirl
*Assistant Examiner* — Ka Shan Choy
(74) *Attorney, Agent, or Firm* — Maschoff Brennan

(57) ABSTRACT

A method for automated ransomware identification includes receiving a first series of data items for backup from a host system, identifying, using a heuristic, a first characteristic of the first series of data items, receiving a second series of data items for backup from the host system, identifying, using the heuristic, a second characteristic of the second series of data items, detecting that the second characteristic differs from the first characteristic in a manner consistent with a ransomware infection, and invoking a recovery procedure responsive to the detecting.

18 Claims, 8 Drawing Sheets

510 ⟶

FIRST JOURNAL FILE – SNAPSHOT 1

| BLOCK | HASH CODE | LOCATION |
|---|---|---|
| 512 ~ 1 (BOB) | 9f9d51bc 70ef21ca 5c14f307 980a29d8 | /mybucket/vmdk/vm0/disk0/v0/p00000000 |
| 514 ~ 2 (ALICE) | 6384e2b2 184bcbf5 8eccf10c a7a6563c | /mybucket/vmdk/vm0/disk0/v0/p00000001 |
| 516 ~ 3 (CAROL) | a9a01980 10a60735 b96434f6 cc5f22a8 | /mybucket/vmdk/vm0/disk0/v0/p00000002 |
| 518 ~ 4 (DAVE) | 16108387 43cc90e3 e4fdda74 8282d9b8 | /mybucket/vmdk/vm0/disk0/v0/p00000003 |

SECOND JOURNAL FILE – SNAPSHOT 2

| BLOCK | HASH CODE | LOCATION |
|---|---|---|
| 522 ~ 1 (BOB) | 9f9d51bc 70ef21ca 5c14f307 980a29d8 | /mybucket/vmdk/vm0/disk0/v0/p00000000 |
| 524 ~ 2 (ALICE) | 6384e2b2 184bcbf5 8eccf10c a7a6563c | /mybucket/vmdk/vm0/disk0/v0/p00000001 |
| 526 ~ 3 (ERIN) | 5f5be389 0fa875bf e8fa797b 4ba6a397 | /mybucket/vmdk/vm0/disk0/v1/p00000002 |
| 528 ~ 4 (EVE) | fa6a91ef 9baa242d e0b354a2 12e8cf82 | /mybucket/vmdk/vm0/disk0/v1/p00000003 |

FIG. 5B

AUTOMATED RANSOMWARE IDENTIFICATION AND RECOVERY

CROSS REFERENCE TO RELATED APPLICATIONS

This patent application is a continuation of U.S. Provisional Patent Application No. 62/615,717 filed Jan. 10, 2018, which is incorporated by reference in its entirety.

BACKGROUND

Ransomware is a type of malicious software ("malware") that, in general terms, executes a denial-of-access attack by infecting a computing system, creating an encrypted copy of data stored at the infected computing system, deleting the original data (or otherwise obstructing access to the data), and then presenting the user or administrator of the infected computing system with an extortive ultimatum requiring payment of a ransom to decrypt the backup. Ransomware may infect a computing system in the same manner as other types of malware, e.g., exploiting security flaws in operating systems and software, manipulating network protocols, tricking users into executing the malware or providing the malware with necessary authorizations (e.g., "phishing"), and other such avenues of attack. Ransomware may hold file contents, metadata, file system data (including file system tables or a master file table), operating system configuration data, and other computing system data hostage until demands are met (e.g., a ransom is paid). Some forms of ransomware are able to infect databases, lock a user or administrator out of resources, and cause a variety of related problems. Examples of known ransomware include "CryptoLocker," "Locky," and "WannaCry."

Disaster recovery and related backup systems can restore a computer system to a previous state, e.g., after the computer system's memory fails or becomes corrupted. A backup system could restore a computing system infected with ransomware, if a backup exists prior to the infection. However, any data generated and stored on the system after the date of the backup will be lost. A system may be infected with ransomware for an extended period of time, with the malicious code quietly encrypting files without the user or administrator's knowledge for days, weeks, or months. It may be difficult to identify an exact date of infection such that a backup prior to infection can be recovered. Furthermore, by the time the ransomware enters an extortion phase, a clean backup may no longer be available or may lack a significant amount of recent data. A user or administrator may still then be forced to pay the ransom or sacrifice data.

SUMMARY

In some aspects, this disclosure relates to methods and systems for use in automated ransomware identification and recovery from an identified ransomware infection. In at least one embodiment, a method for automated ransomware identification includes receiving a first series of data items for backup from a host system, identifying, using a heuristic, a first characteristic of the first series of data items, receiving a second series of data items for backup from the host system, identifying, using the heuristic, a second characteristic of the second series of data items, detecting that the second characteristic differs from the first characteristic in a manner consistent with a ransomware infection, and invoking a recovery procedure responsive to the detecting. In some such embodiments, the recovery procedure includes analyzing the host system to identify the ransomware infecting the host system, restoring the host system to a previous state based on the received first series of data items, and confirming that the previous state is not infected with the ransomware.

The foregoing summary is illustrative only and is not intended to be in any way limiting. In addition to the illustrative aspects, embodiments, and features described above, further aspects, embodiments, and features will become apparent by reference to the following drawings and the detailed description.

BRIEF DESCRIPTION OF THE DRAWINGS

The above and related objects, features, and advantages of the present disclosure will be more fully understood by reference to the following detailed description, when taken in conjunction with the accompanying drawings:

FIG. 5A and FIG. 5B are illustrative tables showing the contents of a first and a second journal file for snapshots from FIG. 4;

Figure 1:
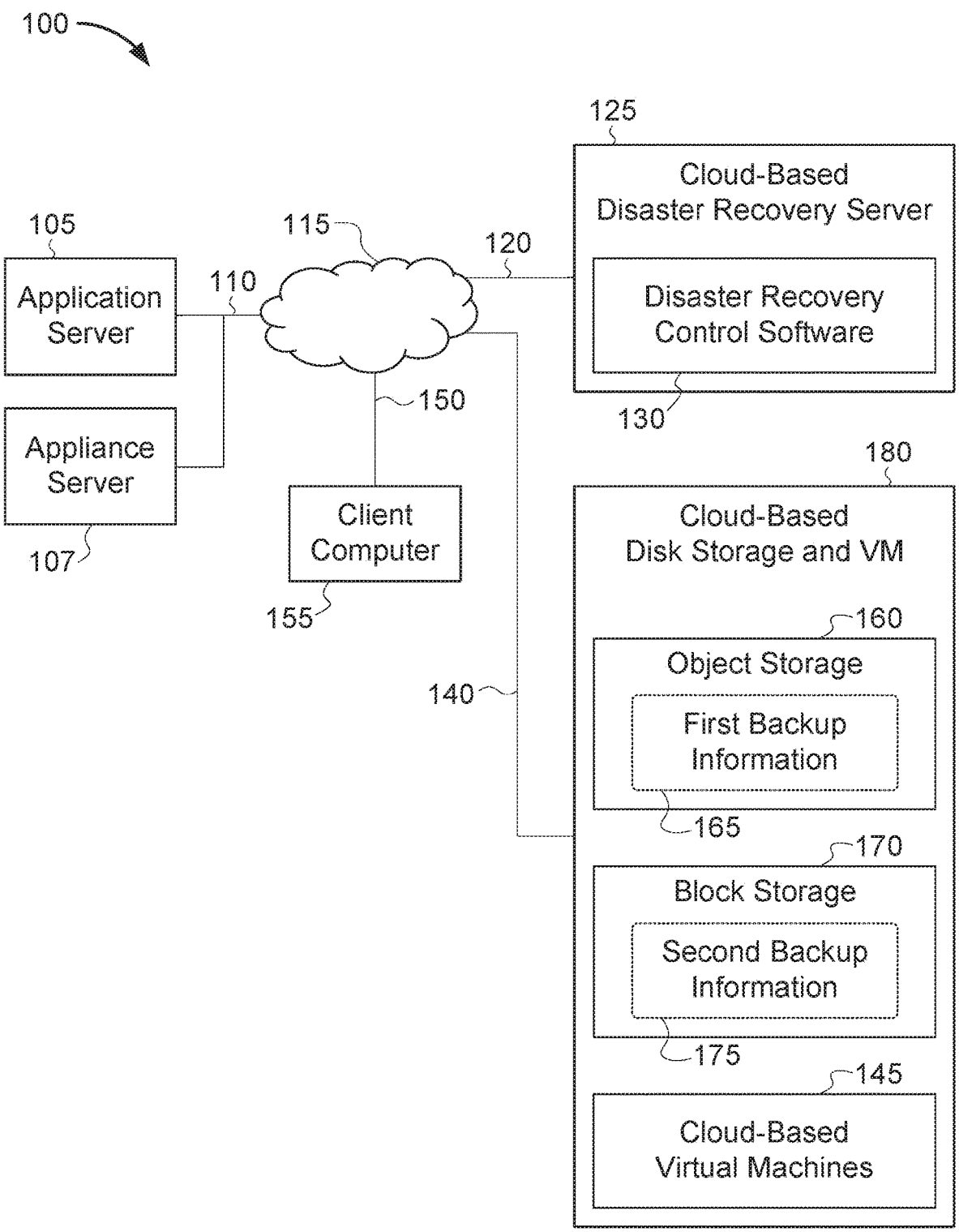
FIG. 1 is a block diagram of an example disaster recovery system.

For purposes of clarity, not every component may be labeled in every drawing. The drawings are provided only for purposes of illustrating examples and are not to be construed as limiting the scope of the disclosure. The drawings are not necessarily drawn to scale. Throughout the drawings, like element numbers are used to describe like elements. It will be readily understood that the aspects of the present disclosure, as generally described herein, and illustrated in the drawings, can be arranged, substituted, combined, and designed in a wide variety of different configurations, all of which are explicitly contemplated and make part of this disclosure.

DETAILED DESCRIPTION

Disaster recovery systems may suitably provide the ability to backup and restore individual computing devices, including both client devices and server devices, and provide the ability to recover the functionality of the computing devices when needed. For example, the backups may be bare-metal backups that restore a new server from a blank or "bare metal" state to the state of the server sometime before a failure event, including restoring its operating system and installed applications. In some implementations, the backups may be incremental backups that only record new or modified data (e.g., new software, modified data files, etc.). Some implementations use a combination of multiple backup techniques, e.g., using an initial (or benchmark) bare-metal backup combined with a time series of incremental backups.

In some implementations, a disaster recovery solution for a computer server includes backing up the programs, data, and infrastructure information to recover the function of the computer server on another machine. The infrastructure information for the computer server can include a description of the network configuration attached to the computer server, the network routing and address information used by the computer server to communicate over the network, etc. In some implementations that employ a cloud-based disaster recovery solution, the functions of the backed-up computer server are recovered on a cloud-based virtual machine using cloud-based data storage.

In some implementations, a disaster recovery solution uses object-oriented (e.g., object-based) storage, block-oriented (e.g., block-based) storage, or a combination of object-oriented and block-oriented storage is used.

Object-oriented storage is a storage architecture that manages data as objects, such as files. For example, an object-oriented storage system can organize the data stored on a computer such that individual files are kept intact. That is, the objects are treated as a whole. Each object can include data, metadata, and an identifier. In some instances, each object represents a single file. In some instances, each object represents multiple files. In some implementations, any suitable object-oriented storage system can be used.

Block-oriented storage is a storage architecture that manages data as blocks of bits/bytes. In some instances, the blocks of data for a given set of data (e.g., a storage device of a computer) are the same size. "Blocking" refers to the process of breaking up a larger set of data into blocks. Each block can contain one or more files and/or partial files. For example a first portion of a file can be at the end of a first block, and the second portion of the file can be at the beginning of a second block. The first and second blocks can be consecutive, and the first and second portions of the file can be, together, the entire file. In some implementations, any suitable block-oriented storage system can be used.

Disaster recovery solutions may suitably be implemented as a local solution or a cloud-based solution. In some local disaster recovery solutions, the computers and systems being backed up and the disaster recovery solution are commonly administered and communicate with each other over a local or private network. In some implementations, the disaster recovery system is a cloud-based solution that uses a network (such as the Internet) for at least a portion of the communication path to the backed-up computer. In some implementations, the cloud-based solution is based on computers that support a virtual machine and virtual data storage that can be configured to emulate the environment of the backed-up computer.

In some implementations, a computer server may suitably be implemented as a real physical computer that executes an operating system and applications. In some implementations, a computer server can be implemented as a virtual machine that executes an operating system and applications in a virtual environment. A virtual machine is an emulation of a particular computer architecture. The virtual machine provides the full functionality of the emulated architecture. A real physical computer server may support multiple (and/or different) virtual machines at the same time.

The computers being backed up and the recovery computer may be local to each other or may be in separate locations. For example, the recovery computer may be in a different building on the same campus or in a different location in another region of the country or the world. The computers and servers being backed up may perform a number of different functions and, as such, the various computers and servers may not all be configured identically. In some implementations, while the computer servers used to recover the backed up computers and servers may have the same hardware configuration, their virtual software and network environments can be configured to emulate the backed-up computer or server.

In some implementations, a server is a computer used to provide certain features or functions to users and/or other computing devices. In various implementations, the server may be a web server, a database server, a disk server, a media server, etc.

In some implementations, cloud-based disaster recovery solutions use virtual machines and virtual network switches. The virtual machines can be quickly configured to emulate a real physical server that is being backed up or a virtual machine running an application that is being backed up. The virtual network switches can be configured using low-level building block functions to emulate the network environment or infrastructure of the backed-up computer or system.

FIG. 1 is a block diagram of an example disaster recovery system 100. The system 100 includes an application server 105 connected to the Internet 115 over a network 110. In some implementations, the Internet 115 may not be used and the various networks can be connected via any suitable means. In some implementations, the server 105 executes applications that provide a service to customers over the Internet 115. It should be noted that the application server 105 may suitably be referenced as a source server 105 or source application server 105. The system 100 also includes an appliance server 107 which communicates with the application server 105 and is also connected to the Internet 115 over the network 110. In some implementations, the application server 105 and the appliance server 107 can be remote from one another and/or can be connected to one another through the Internet 115.

The system 100 further includes a client computer 155 connected to the Internet 115 over a network 150. In some implementations, the client computer 155 can be connected to one or more of the servers illustrated in FIG. 1 through any suitable communication media. In an illustrative implementation, the client computer 155 communicates with the server 105 over the Internet 115 and the server 105 provides a function to the client computer 155. In different implementations, the server 105 provides different functions to the client computer 155. For example, the server 105 may suitably implement a web server and provide web pages that are accessed by the client computer 155. In some implementations, communication over the Internet 115 includes using a virtual private network ("VPN") connection.

In some implementations, cloud-based products and solutions are referred to as hosted services and are provided over the Internet 115. Such services can be provided rapidly when needed and released when no longer required. In some instances, the term "cloud" is synonymous with the Internet 115 or communications, services, and transactions that use the Internet 115 for at least a part of a transmission to one or more computers that provide a service. Although various elements are referred to as "cloud-based," in some implementations, such elements may not be cloud-based and may communicate via any suitable method. In some implementations, the various components that are described as connected via the Internet 115 and/or via the cloud are directly connected and/or are of the same computing device.

The system 100 further includes a cloud-based disaster recovery server 125 connected to the Internet 115 over a network 120. In some implementations, the disaster recovery server 125 implements disaster recovery control software 130. The disaster recovery control software 130 coordinates the various operations that make up the disaster recovery system. In some implementations, any suitable computing device or method can be used to coordinate operations of the disaster recovery system. In some implementations, to the disaster recovery control software 130, the server 105 is known as the source computer 105 because it is the computer being backed up for recovery. In some implementations, any computing device can be the source computer to be backed up.

The system 100 further includes a host cloud-based disk storage and virtual machines 180 connected to the Internet 115 over a network 140. The cloud-based disk storage 180 includes two types of virtual mass data storage as a cloud-based service. The first type of data storage is object storage 160. In most instances, object storage 160 has the highest level of data reliability and durability. However, object storage usually has lower data storage performance and lower cost-per-byte of stored data. In most instances, object storage 160 is not used to directly bring up (or spin up) a virtual machine to recover a failed computer. An example of a commercial object-based storage product is Amazon.com Inc.'s S3 (simple storage service) online file storage web service. Another example of a commercial object-based storage product is Google Inc.'s Cloud Storage Platform.

The second type of data storage is block storage 170. In most instances, block storage 170 has the advantage that a virtual machine can be spun up directly from data stored in block storage 170. Block storage 170 generally has higher data storage performance but has a much higher cost-per-byte of data stored. Data storage performance is a measure of the time required to move data into or out of the storage. Lower performance means that it takes longer to move data. Higher performance means that it takes less time to move data. Virtual machines can be created with data stored in block storage 170. An example of a commercial block storage product is Amazon.com Inc.'s Elastic Block Store (EBS) and Google Inc.'s Compute Engine Persistent Disks.

In an illustrative implementation, first backup information 165 is stored in object storage 160 and second backup information 175 is stored in block storage 170. The first and second backup information 165, 175 may each suitably include one or more snapshots of the server 105. Each snapshot includes the information to recover the server 105 back to the time the snapshot was taken. The snapshots can be copies of the data stored on the server 105. In some implementations, any suitable computing device can be backed up.

A host for cloud-based disk storage and virtual machines 180 is connected to the cloud-based disaster recovery server 125 over the network 140, the Internet 115, and the network 120. In some implementations, the host for cloud-based disk storage and virtual machines 180 is connected to the cloud-based disaster recovery server 125 via any suitable communications method. In some implementations, the host for cloud-based disk storage and virtual machines 180 is used to recover servers that are backed up and experience a disaster event. The host for cloud-based disk storage and virtual machines 180 provides one or more cloud-based virtual servers 145. For example, if an application server 105 fails, a cloud-based virtual machine 145 can be created (or uploaded, etc.) that replicates the application server 105. The cloud-based virtual machine 145 receives the data necessary to replicate the application server 105 from the first and second backup information 165, 175.

The server 105, the cloud-based disaster recovery server 125 and the host for cloud-based disk storage and virtual machines 180 may suitably be implemented using one or more different configurations of computer hardware and software.

Figure 2:
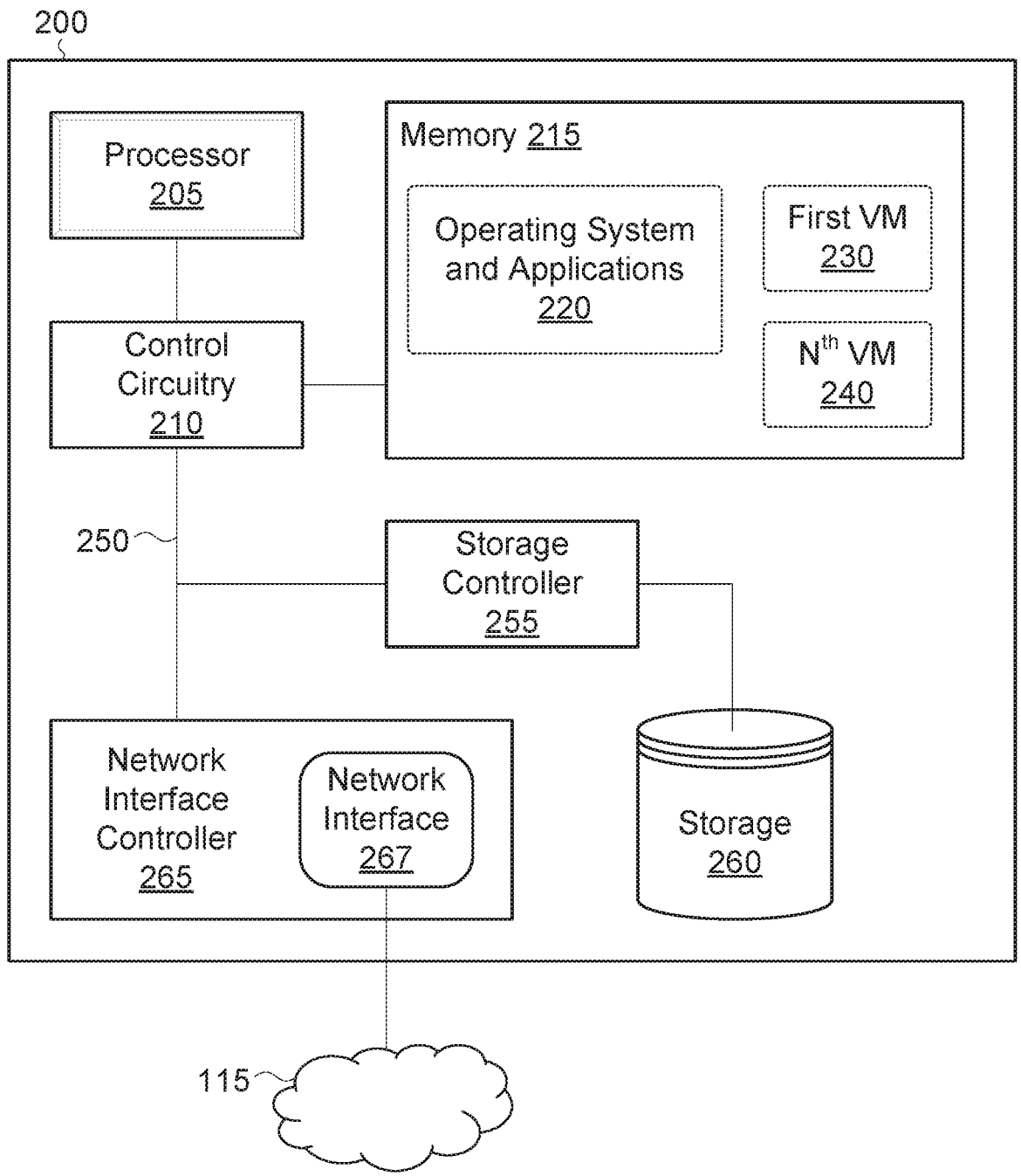
FIG. 2 is a block diagram illustrating an example physical server.

FIG. 2 is a block diagram illustrating an example physical server 200. In some implementations, additional, fewer, and/or different elements may be used. The real physical server 200 may suitably be configured to implement one or more of the servers (e.g., 105, 125, and/or 180). In other implementations, one or more of the servers may suitably be implemented using a converged infrastructure platform.

In an illustrative implementation, the real physical server 200 is used to directly execute applications that perform functions for a client (e.g., a user, another computer, etc.). In some implementations, the real physical server 200 executes software that creates one or more virtual machines (VMs). The one or more virtual machines execute applications that perform the functions for the client. In some implementations, the real physical server 200 may suitably be used to connect to and manage external disk storage devices that provide large amounts of data storage.

In an illustrative implementation, the real physical server 200 includes a processor 205, control circuitry 210, a memory 215, a disk controller 255, a disk storage 260, and a network interface controller 265 for one or more network interfaces 267. Some implementations may include one or more network interface cards. The network interface card 165 connects to the Internet 115 (or any other suitable network or device) over a network 285. Additionally in some implementations, the processor 205 includes multiple processors or processors with multiple cores or a combination thereof.

In an illustrative implementation, the control circuitry 210 includes components that allow the processor 205 to communicate with: the memory 215 to read and write to the contents of the memory 215; the disk controller 255; and the network interface controller 265.

In an illustrative implementation, the memory 215 uses non-transitory storage devices including one or both of volatile and non-volatile memory. The non-volatile memory may suitably include flash memory and/or other types of solid-state electronic memory and rotating storage devices such as disk drives or the like. Non-volatile memory retains stored information after power is removed from the memory and until power is restored. Computer instructions in the form of an operating system and applications 220 can be stored in the memory 215. When the computer instructions are executed by the processor 205, the instructions cause the processor 205 to control the devices, controllers, and peripherals attached to or part of the server 205 and to perform the functions of the real physical server 200. The applications 220, when executed, may suitably provide features or functions directly or the applications 220 may suitably implement a number of virtual machines, from a first VM 230 to an $N^{th}$ VM 240. When the virtual machines 230-240 are implemented, one or more of the applications 220 are executed by the one or more of the virtual machines 230-240 to provide features and functions. Other implementations of the present disclosure includes additional, fewer, and/or different virtual machines.

In an illustrative implementation, the disk storage 260 includes one or more disk drives for the storage of digital data. The one or more disk drives may suitably be interconnected by high speed data networks (or by any other suitable connection) and some (or all) of the disk drives may be external to the real physical server 200 and connected by a network. The external disk storage may suitably include racks of disk storage modules located in the same physical location. In some implementations, some of the external disk storage may be located in remote physical locations. In some implementations, the disk storage 260 provides thousands of terabytes of data storage. In some implementations, the disk storage 260 also provides different levels of data performance.

In some implementations, some or all of the disk drives are solid-state disk drives in which the rotating disks of traditional disk drives are replaced by solid-state memory devices that have few to no moving mechanical components. In some implementations, the solid-state memory devices provide increased performance over rotating disk drives.

In some implementations, virtual machines (VM) are used to recover failed computers. Virtual machines (VM) are implemented using disk storage 260 in the real physical server 200. However, cloud-based virtual machines can be implemented using cloud-based fast storage.

Figure 3:
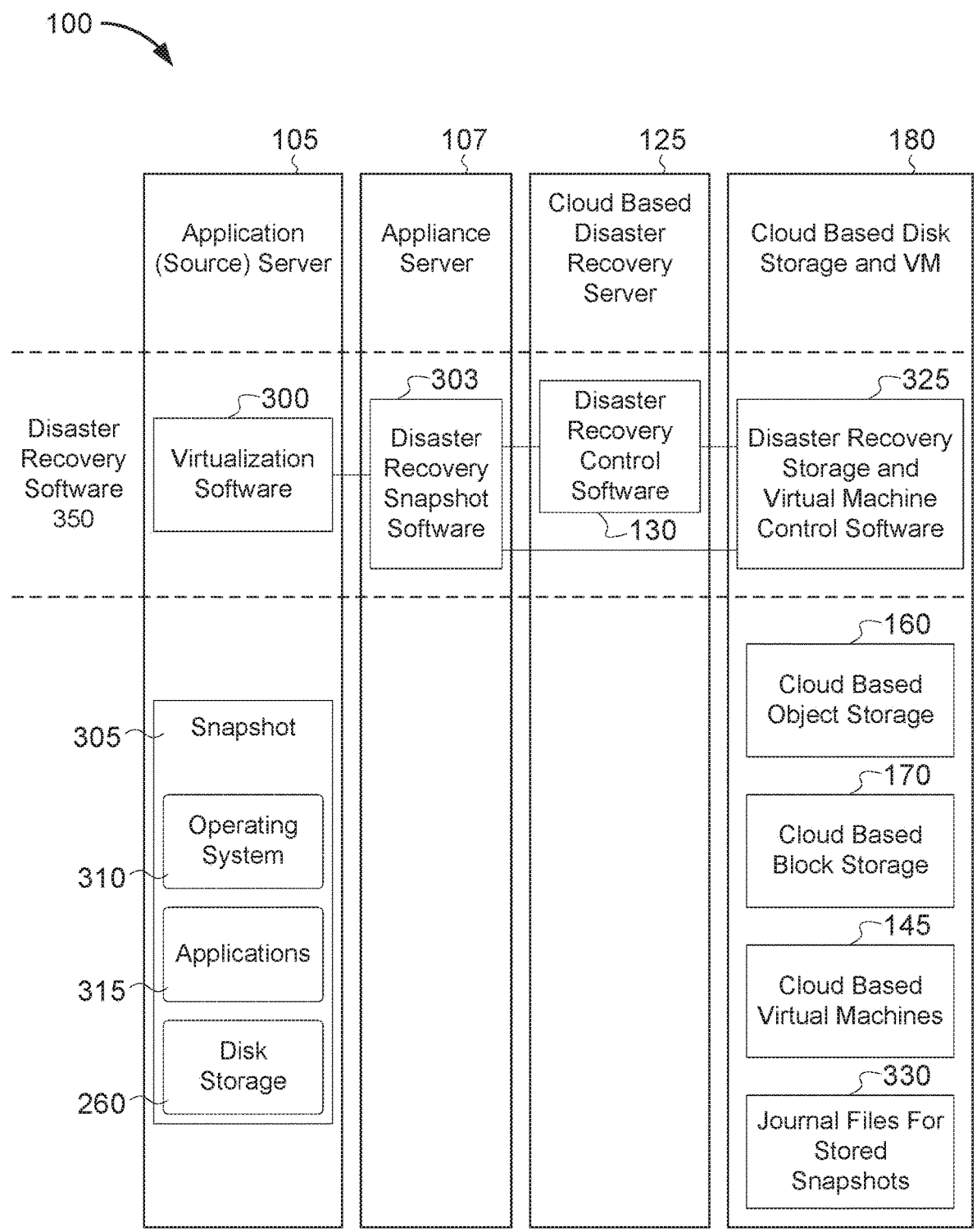
FIG. 3 is a block diagram illustrating an example structure of disaster recovery software.

FIG. 3 is a block diagram illustrating an example structure of disaster recovery software. The functions of the disaster recovery software 350 are divided between the application server 105, the appliance server 107, the disaster recovery server 125, and the cloud-based disk storage and virtual machine service 180. A portion of the disaster recovery software 350 resides and executes on each of the devices 105, 107, 125, 180. In some implementations, one or more of the elements shown with one device can be implemented and/or performed by another device. For example, in some implementations, the Application Server 105 or the Appliance Server 107 may include disaster recovery software, e.g., the disaster recovery control software 130 that monitors and controls functions of the disaster recovery system 100.

Virtualization software 300 provides a function of the disaster recovery software 350 and resides on the application server 105. The virtualization software 300 is responsible for capturing snapshots 305 of software and applications executed on the application server 105. Each snapshot 305 is transferred to disaster recovery snapshot software 303 for processing and possible transfer to cloud-based storage. In some implementations, the virtualization software 300 is implemented using VSphere software produced by VMware Inc.

The disaster recovery snapshot software 303 is part of the disaster recovery software 350 and resides on the appliance server 107. In some implementations, the appliance server 107 may exist as a virtual machine running on the application server 105. The disaster recovery snapshot software 303 is responsible for: periodically receiving a snapshot of the application server 105; calculating a hash code for each block (or object) of the captured snapshot; determining for each block (or object) of the captured snapshot, if an identical block (or object) has already been stored on the cloud-based disk storage and VM service 180; transferring blocks (or objects) that are not identical to a block (or object) already stored on the cloud-based disk storage and VM host 180; and maintaining a journal file 330 for each captured snapshot that includes information on each block (or object) of the snapshot. Data transferred to the cloud-based disk storage and VM service 180 are stored in cloud-based object storage 160. In some implementations, the cloud-based object storage 160 costs less and has lower performance than the cloud-based block storage 170. A full snapshot of the application server 105 may suitably include a copy of an operating system 310, applications 315, and data stored on the disk storage 260. In some implementations, the appliance server 107 is a server separate from the application server 105. In some implementations, the appliance server 107 provides back-up and recovery services to multiple computing devices in a local network, e.g., providing back-up services for the application server 105 and one or more additional protected client systems. In some implementations, all back-up and recovery functionality is implemented on the appliance server 107. In some such implementations, the appliance server 107 is replicated to an off-site location, e.g., to a remote cloud. The remote replicated data may then be used to recover the appliance server 107 and or the systems protected by the appliance server 107.

Transferring data from the cloud-based object storage 160 to the cloud-based block storage 170 (sometimes called volume block storage) can usually be a relatively slow process because the data is transferred over at least one network and is reorganized for block storage. In some implementations, moving large amounts of data from object storage 160 to block storage 170 can require hours to complete. In some implementations, recovery time objectives (RTO) are used to determine that the recovery of a failed computer be completed in one hour or less. In some instances, recovering a failed computer in one hour or less is not possible or feasible when snapshots are stored (only) in object storage 160.

In some implementations, when snapshots are received from the appliance server 107, the snapshots are stored in object storage 160 primarily because object storage 160 has the highest reliability and secondarily because object storage 160 generally has lower costs. However, to meet recovery time objectives, some snapshots may be moved into the block storage 170. In some implementations, deciding which snapshots to transfer to block storage 170 is important to meeting recovery time objectives.

The disaster recovery software 350 may also include the disaster recovery control software 130, which resides in the cloud-based disaster recovery server 125. The disaster recovery control software 130 monitors and controls the high level functions of the disaster recovery system 100. The disaster recovery control software 130 determines (or is informed) that a failure event has occurred (or that a backup computer is to be restored). In response, the disaster recovery control software 130 initiates a recovery for the failed computer, such as the source server 105. The disaster recovery control software 130 also provides customer and field service interfaces to control the features and functions of the disaster recovery system 100.

In some implementations, the disaster recovery software 350 includes the disaster recovery storage and VM control software 325. The VM control software 325 communicates with the disaster recovery control software 130 and the disaster recovery snapshot software 303. The VM control software 325 receives requests from the disaster recovery snapshot software 303 to receive and store snapshots in object storage 160. The disaster recovery storage and VM control software 325 also controls the process of warming a snapshot or block and determining which snapshot or block should be warmed. Warming a snapshot includes moving the portions (e.g., blocks) of the snapshot from cloud-based object storage 160 to cloud-based block storage 170. As discussed above, in many implementations, cloud-based block storage 170 has high performance and can be directly used to create a virtual machine to recover a failed server using a stored snapshot. Cloud-based object storage 160 may not be organized for direct execution by a computer and may not have the performance required to execute the software stored as objects.

Figure 4:
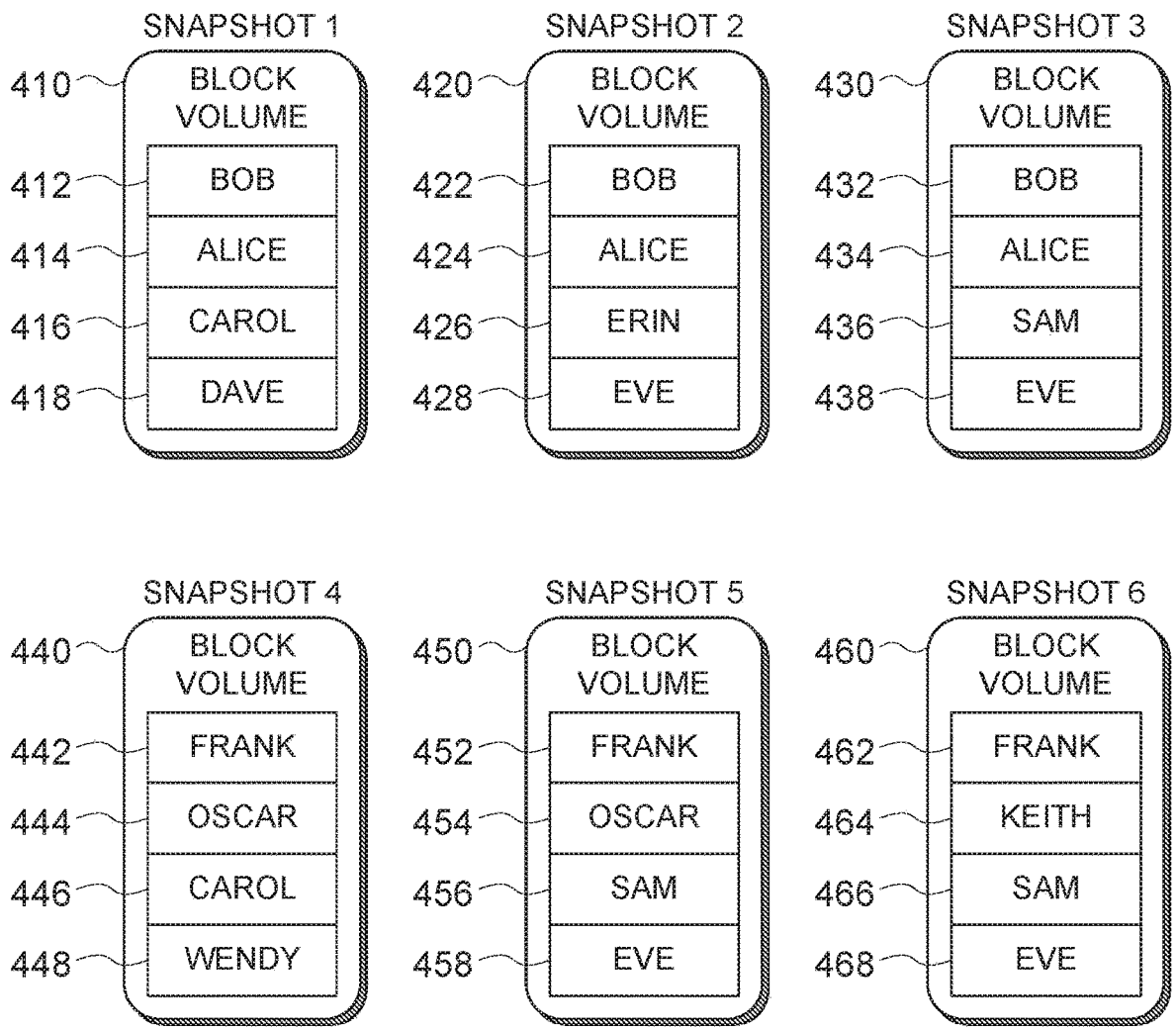
FIG. 4 is an illustration of six example snapshots.

FIG. 4 is an illustration of six example snapshots 410, 420, 430, 440, 450, and 460 in accordance with an illustrative implementation. The snapshots 410, 420, 430, 440, 450, and 460 are taken from the source server 105 (or whichever computer is being backed up). Each snapshot is comprised of blocks of data. The size of a block can vary but typically may vary from kilobytes to gigabytes. Each of the six snapshots of FIG. 4 is comprised of four blocks to simplify the examples discussed herein. In some implementations, a snapshot may suitably have thousands or tens of thousands (or more) of blocks. Additionally, in some implementations, snapshots may have different amounts of blocks. Also, for explanatory purposes, each block is assigned a name to make them easier to recognize. In actual use, such names may not be used to identify blocks. In some implementations, objects may be used in place of blocks.

Blocks with the same name have identical data and the same hash value. In actual use, the hash value is used to determine if two blocks have identical data. Therefore, blocks with the same name are interchangeable with each other. As such, blocks with the same name only need to be transferred to and stored in cloud-based object storage 160 once. After a block has been stored in the cloud-based object storage 160 once, subsequent blocks with the same hash value may not be stored. Rather, in such implementations, a reference to the prior stored block is used. The actual reference may indicate a location in the object storage 160 or block storage 170, depending upon which device the block is stored in.

Each of the six snapshots 410, 420, 430, 440, 450, and 460 is captured by the disaster recovery snapshot software 303 that is executed on the source server 105. The timing for the capture of each snapshot can be determined by parameters maintained by the disaster recovery control software 130. In an illustrative implementation, the timing for the capture of each snapshot is communicated to the disaster recovery snapshot software 303 from the disaster recovery control software 130. As each block of a snapshot is captured, the disaster recovery snapshot software 303 calculates a cryptographic hash code for the captured block and transmits the hash code to the disaster recovery storage and VM control software 325. The VM control software 325 can use the hash code to determine if an identical block has already been stored. If an identical block has not already been stored in the cloud-based object storage 160, the disaster recovery snapshot software 303 transmits the block to the disaster recovery storage and VM control software 325 for storage in the cloud-based object storage 160.

Snapshot 1 (410) is comprised of blocks "BOB" 412, "ALICE" 414, "CAROL" 416, and "DAVE" 418. Snapshot 2 (420) is comprised of blocks "BOB" 422, "ALICE" 424, "ERIN" 426, and "EVE" 428. Snapshot 3 (430) is comprised of blocks "BOB" 432, "ALICE" 434, "SAM" 436, and "EVE" 438. Snapshot 4 (440) is comprised of blocks "FRANK" 442, "OSCAR" 444, "CAROL" 446, and "WENDY" 448. Snapshot 5 (450) is comprised of blocks "FRANK" 452, "OSCAR" 454, "SAM" 456, and "EVE" 458. Snapshot 6 (460) is comprised of blocks "FRANK" 462, "KEITH" 464, "SAM" 466, and "EVE" 468.

FIG. 5A is a table showing the contents of a first journal file 510 for snapshot 1 (410) of FIG. 4 in accordance with an illustrative implementation. The first journal file 510 includes an entry for each block that comprises snapshot 1 (410). The first journal file 510 includes three columns of information for each block stored in the first journal file 510. The first column is an identifier for the block. In this example, the blocks are identified with names. In some implementations, the first column may suitably include an index that indicates to the disaster recovery software 350 where to place the block to recover the original block volume. The second column is the cryptographic hash code for the block that was received from the disaster recovery snapshot software 303. Any suitable hash can be used to determine the cryptographic hash code. The third column is an object handle that identifies where the block is stored in the cloud-based object storage 160. The object handle is used to retrieve the block from the cloud-based object storage 160. Additional information, not shown, can also be included in the journal files. The first journal file 510 for snapshot 1 (410) includes a first entry 512 for block "BOB" 412, a second entry 514 for block "ALICE" 414, a third entry 516 for block "CAROL" 416, and a fourth entry 518 for block "DAVE" 418.

FIG. 5B is a table showing the contents of a second journal file 520 for snapshot 2 (420) of FIG. 4 in accordance with an illustrative implementation. The second journal file 520 includes an entry for each block that comprises snapshot 2 (420). As with the first journal file 510, the second journal file 520 includes three columns of information for each block stored in the second journal file 520. The first column is an identifier for the block. The second column is the cryptographic hash code for the block that was received from the disaster recovery snapshot software 303. The third column is an object handle that identifies where the block is stored in the cloud-based object storage 160. The object handle is used to retrieve the block from the cloud-based object storage 160. The second journal file 520 for snapshot 2 (420) includes a first entry 522 for block "BOB" 422, a second entry 524 for block "ALICE" 424, a third entry 526 for block "ERIN" 426, and a fourth entry 528 for block "EVE" 428.

It should be noted that block "BOB" and block "ALICE" are common to both snapshot 1 (410) and snapshot 2 (420). The hash code and location information for "BOB" and "ALICE" are the same in the journal files 510 and 520 for the respective snapshots 410 and 420. The location information for "BOB" in snapshot 1 (410) is the same as the location information for "BOB" in snapshot 2 (420). The location information for "ALICE" in snapshot 1 (410) is the same as the location information for "ALICE" in snapshot 2 (420). Accordingly, blocks "BOB" and "ALICE" are only stored once in the cloud-based object storage 160.

In some implementations, the disaster recovery system 100 supports multiple customers at one time. Each customer may have multiple computers that are protected by the disaster recovery system 100 in case of a failure of one of the computers, a communications failure that prevents users from accessing one of the computers, or any other event that requires a backup. Each customer (or any suitable entity) can determine, for example, the frequency that snapshots should be captured (e.g., once per day, once per hour, etc.), the length of time that snapshots should be stored (e.g., one week, one month, etc.), how many snapshots should be stored (e.g., twenty snapshots per device, etc.), etc.

In some implementations, a difference function analyzes two (or more) snapshots and determines which blocks are different between the two (or more) snapshots. For example, if snapshot 1 (410) is stored in the block storage 170 with no shared blocks, the function determines what blocks must be replaced or overlaid to create snapshot 2 (420). For example, set A is equal to the four blocks of snapshot 1 (410) and set B is equal to the four blocks of snapshot 2 (420), as follows:

$A=\{$(entry 1: BOB),(entry 2: ALICE),(entry 3: CAROL),(entry 4: DAVE)$\}$ $B=\{$(entry 1: BOB),(entry 2: ALICE),(entry 3: ERIN),(entry 4: EVE)$\}$ The difference function for sets A and B produces the following result set:

diff(A,B)={(entry 3: CAROL),(entry 4: DAVE)}

The difference function for sets B and A produces the following result set:

diff(B,A)={(entry 3: ERIN),(entry 4: EVE)}

Block entry 1 ("BOB") and block entry 2 ("ALICE") are the same for both snapshot 1 (410) and snapshot 2 (420) so there is no difference between the snapshots for entry 1 and entry 2. However, entry 3 and entry 4 are different, so to create a standalone image in block storage 170 for snapshot 2 (set B) (420) from snapshot 1 (set A) (410), blocks "BOB" 412 and "ALICE" 414 are copied from snapshot 1 (410) and block "ERIN" is overlaid in entry 3 (426) and block "EVE" is overlaid in entry 4 (428).

In some implementations, a distance function determines the number of different blocks between two snapshots. For example, s1 represents the blocks of snapshot 1 (410) and s2 represents the blocks of snapshot 2 (420). The distance between s1 and s2 is 2 and is depicted as follows:

dist(s1,s2)=2

The distance between two snapshots is calculated by determining the number of different blocks between the two snapshots. For the above example, the function first checks the first entry in the journal file for each snapshot. Since "BOB" is the first entry 512 and 522 in both journal files 510 and 520, the distance is 0 for the first entry. The function checks the second entry in each journal file. "ALICE" is the second entry 514 and 524 in both journal files 510 and 520, so the distance is 0 for the second entry. The function checks the third entry in each journal file. "CAROL" 516 is the third block for s1 and "ERIN" 516 is the third block for s2. Because the blocks are different, the distance is 1 for the third entry. The function checks the fourth entry in the journal file. "DAVE" 518 is the fourth block for s1 and "EVE" 528 is the fourth block for s2. Because the blocks are different, the distance is 1 for the fourth entry. The function adds up the difference values for each entry and determines that the distance between s1 and s2 is two because two blocks are different between s1 and s2.

In some implementations, the distance function uses different methods to determine a distance between two snapshots. For example, a distance function may suitably assign weights to each snapshot where the most recent snapshot has the most weight. For example, the two most recent snapshots (e.g., s1 and s2) can be preferred over the other snapshots. That is, for example, the more recent snapshots may be more relevant snapshots in that if the computing device is to be restored, it is likely that the device will be restored using one of the more recent snapshots. In some implementations, when calculating the distance function, a weighting factor can be subtracted from the distance for the more recent snapshots (e.g., the two most recent snapshots).

The disaster recovery system 100 implements a disaster recovery cycle. In some implementations, the disaster recovery cycle begins with an initial "full" snapshot of a protected system. However, as described above, each snapshot is comprised of blocks of data. In some implementations, after a "full" snapshot has been recorded, the disaster recovery system 100 only records changed blocks of data. A protected system can be restored to a time corresponding to a previous state by restoring each of the blocks of data most recent to the time corresponding to the previous state. In some implementations, where the disaster recovery system 100 only records changed blocks of data, the disaster recovery system 100 records the changed data blocks at frequent intervals, e.g., every week, every day, every hour, every few minutes (e.g., 10 minutes, 12 minutes, 15, minutes, etc.), every minute, or even every fraction of a minute (e.g., every 10, 12, or 15 seconds).

In general, a protected system will include some data that is generic to computing devices similar to the protected system. For example, consumer computers running the same operating system may have portions of their respective storage dedicated to identical copies of operating system data. Similarly, computer systems within an organization may be uniform. Accordingly, some of the blocks of data in a snapshot may be identical across multiple protected systems. In some implementations, the disaster recovery system 100 identifies instances of such identical blocks of data and conserves storage space by eliminating the redundant copies. For example, as explained above, if a snapshot for a first protected system includes a block (e.g., "A") and a snapshot for a second protected system includes a block (e.g., "B") that is identical to the block labeled "A" from the first protected system, then both may be represented with the same location (i.e., block "A" is stored at location X, and block "B" is stored at the same location X, because the data itself is identical.) The term "deduplication" refers to identifying the identical blocks and eliminating redundant copies. In some implementations, identical blocks are identified by the disaster recovery system 100 by first detecting a hash code collision (where the hash code for a block is already used by another block of data stored by the disaster recovery system 100) and then, responsive to detecting the hash code collision, performing a bitwise comparison of the blocks of data to confirm that they are identical. Blocks of data with different hash codes will be different, but blocks of data sharing a same hash code may be identical or may be different.

The disaster recovery system 100 may measure values or statistics for one or more metrics. For example, in some implementations, the disaster recovery system 100 identifies a percentage of bocks of data for a protected system that are identical to blocks of data from other systems. That is, the disaster recovery system 100 identifies a percentage of bocks of data for a protected system that can be (or have been) deduplicated. As new data is received into the disaster recovery system 100, a certain percentage (or percentage range) of data blocks are expected to be deduplicated. In some implementations, the exact percentage or percentage range is based on additional factors such as the type and/or context of the protected system. In some implementations, the disaster recovery system 100 may detect divergence from the expected percentage (or percentage range) of blocks that are deduplicated (or not deduplicated).

Figure 6:
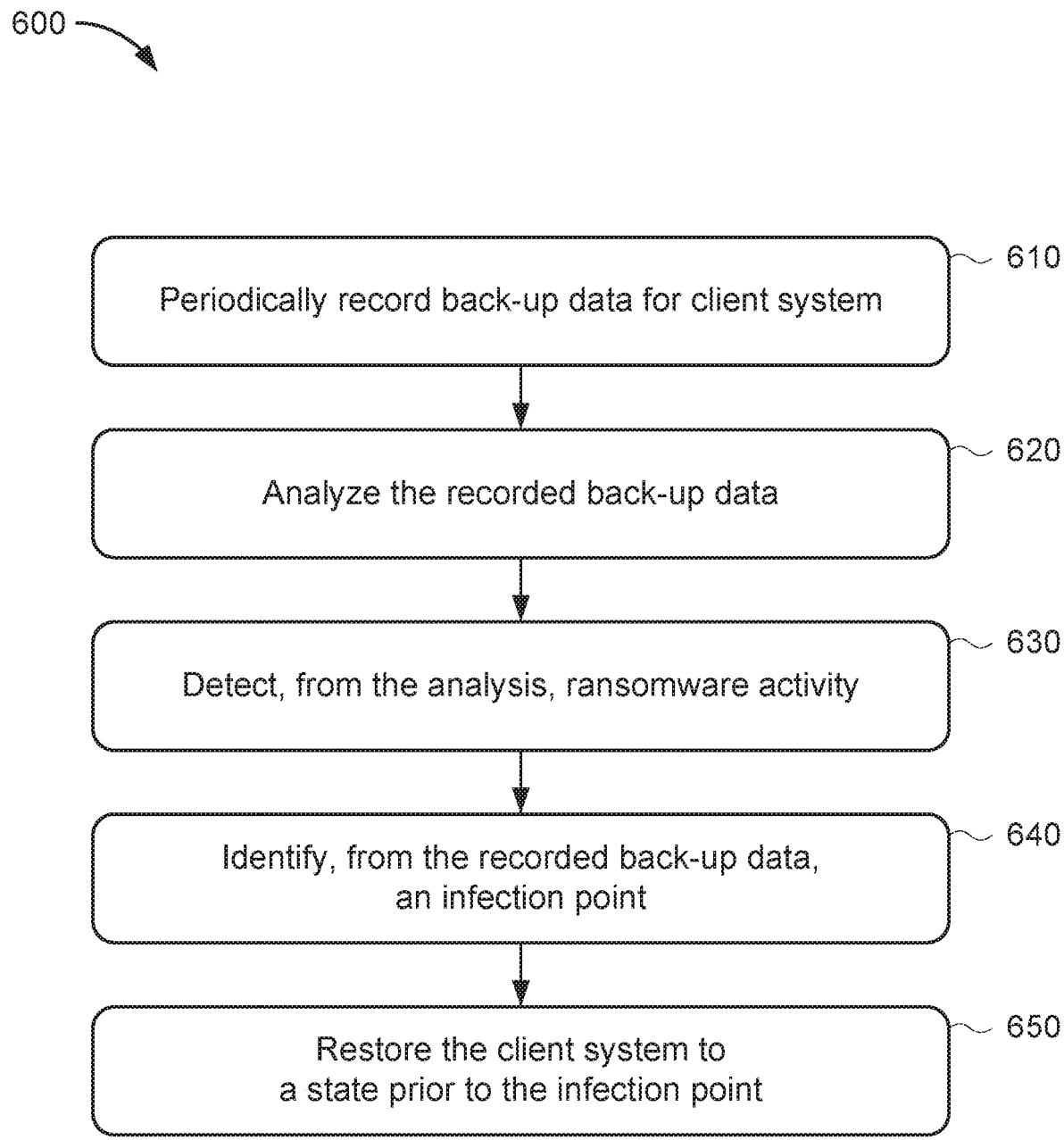
FIG. 6 is a flowchart for a method of automated ransomware detection and recovery.

FIG. 6 is a flowchart for a method 600 of automated ransomware detection and recovery. In brief overview of the method 600, at stage 610, a disaster recovery system 100 periodically records back-up data for a client system (i.e., a protected system). At stage 620, the disaster recovery system 100 analyzes the recorded back-up data and, at stage 630, detects, from the analysis, ransomware activity. At stage 640, the disaster recovery system 100 identifies, from the recorded back-up data, an infection point. The infection point represents a demarcation between a point after which the client system is infected with malware (e.g., the detected ransomware) and before which the client system is not infected with the malware. At stage 650, the disaster recovery system 100 restores the client system to a state prior to the infection point.

Referring to FIG. 6 in more detail, at stage 610, a disaster recovery system 100 periodically records back-up data for a client system (i.e., a protected system). In some implementations, the disaster recovery system 100 records back-up data as changes in blocks of data. In some implementations, the disaster recovery system 100 polls the client system for changed blocks of data at frequent intervals, e.g., every week, every day, every hour, every few minutes (e.g., 10 minutes, 12 minutes, 15, minutes, etc.), every minute, or even every fraction of a minute (e.g., every 10, 12, or 15 seconds). A block may be detected as having changed if there is a timestamp recorded in the block that is newer than a previous polling time. A block may be detected as having changed if a hash value for the block does not match a previously recorded hash value for the block. In some implementations, the disaster recovery system 100 records changed blocks of data as they are identified, e.g., from the polling. In some implementations, the disaster recovery system 100 records new and modified files as they are saved to the client system. In some implementations, an application executed on the client system notifies the disaster recovery system 100 of changes. In some implementations, an application executed on the client system transmits new or modified data to the disaster recovery system 100 as it is created or saved at the client system.

In some implementations, the disaster recovery system 100 records back-up data for a protected client system in stages. For example, an appliance server 107 in a local network may obtain data from the protected client system for back-up and periodically report the obtained data to a remote (e.g., cloud-based) server such as the cloud-based disaster recovery server 125 illustrated in FIG. 1. The localize appliance server 107 may obtain data from multiple local protected client systems within the local network. For example, a corporate network may include an appliance server 107, e.g., at the premises of an office, to protect multiple client systems (e.g., individual workstations) within the office. In some implementations, the remote server (e.g., the cloud-based server) includes functionality to analyze the back-up data and detect ransomware, as described here. In some implementations, the local appliance server 107 includes some or all of this functionality, as well.

At stage 620, the disaster recovery system 100 analyzes the recorded back-up data. In some implementations, the analysis includes monitoring the recorded back-up data for trends. For example, in some implementations, with each periodic back-up for a protected system, the disaster recovery system 100 compares the types, amounts, entropy, or other qualities of the data in the back-up to previous back-up events for the same protected system and/or to similar back-up events for similar protected systems. In some implementations, the analysis includes comparing deduplication statistics for a client system to an expected deduplication statistic for the client system. Some implementations record data for one or more characteristics sufficient to detect activity indicating malware or ransomware activity.

The data in the back-up may be, for example, of specific file types such as document files, image files, multi-media files, etc. In some implementations, the disaster recovery system 100 verifies that a file in the back-up that is marked or designated as a particular file type actually conforms to the particular file type. A file may be marked or designated as a particular file type when the file has file name with an extension (a file extension) corresponding to the particular file type. A file may be marked or designated as a particular file type when the file is associated with metadata indicating the particular file type. For example, when the disaster recovery system 100 records an image file in a back-up (e.g., a file ending with a BMP, JPG, JPEG, GIF, PNG, TIFF, or other image file type extension), the disaster recovery system 100 validates whether the purported image file adheres to the file format for the corresponding image type (e.g., whether a file marked or designated as a JPEG file conforms to an IEEE JPEG file format standard). In some implementations, the disaster recovery system 100 verifies that a file conforms to a legitimate file type based on a file-type fingerprint. In some implementations, the disaster recovery system 100 verifies that a file conforms to any of a set of acceptable file-type fingerprints, e.g., fingerprints for image file types, audio file types (e.g., WAV, WMA, MP3, etc.), document file types (e.g., TXT, DOCX, XLSX, PDF, etc.), and known library data file types (e.g., DLL, CPP, JAVA, etc.). If they file is non-conforming, this may indicate a corrupt file or a mislabeled file, where the later may be unintentional or intentional. An intentionally mislabeled file may indicate malware or ransomware activity.

The amount of data, e.g., the number of files or the amount of storage space used, in a routine back-up may adhere to predictable usage patterns. For example, a system might routinely generate a few hundred megabytes of new data on a typical workday. If the system then generates a few gigabytes, or more, of new data, this may indicate a change in use or this may indicate malware or ransomware activity.

In some implementations, the disaster recovery system 100 maintains a catalog or history of file modifications for each protected system. File modification types include, for example, append events, overwrite events, new files creation events, etc. A change in the rate at which a protected system modifies files, or a shift in the types of modification, may indicate a change in use or may indicate malware or ransomware activity. In some implementations, the disaster recovery system 100 analyses file modification events to compare event trends to historical events for the protected system and/or historical events for protected systems similar to the protected system.

Some computer-generated data exhibits more randomness (entropy) than other data. For example, a text document will primarily contain computer encoding of characters used to represent language (e.g., ASCII or UNICODE characters). In a raw format, where each character is represented by its encoding, the byte distribution in the file will be primarily of bytes corresponding to characters, and then distributed within that set in accordance with character frequency. This distribution is non-uniform. However, an encrypted file is expected to be more uniform, exhibiting a significantly higher level of randomness. The term "entropy" is used to quantify or indicate a degree of randomness. For example, Shannon Entropy (named for Claude E. Shannon) quantifies entropy as a value, H, (in reference to work by Ludwig Boltzmann). Shannon Entropy is generalized as the negative of the sum, for a set of possible events, of the probability of each event multiplied by the logarithm of that probability. Shannon Entropy is formalized, for each event instance i with probability $p_i$, as: $H=-\Sigma_i p_i \log p_i$. Some implementations use Shannon Entropy. Other quantifications of randomness include, for example, Hartley entropy, collision entropy, min entropy, and Rényi entropy. Implementations within the scope of this disclosure may use any of these quantifications of entropy or any other quantifications of entropy. Some implementations use one or more of the tests in the NIST statistical test suite for randomness, "NIST SP 800-22."

The randomness of data in the back-up during routine back-ups may differ from the randomness of data in a back-up after a ransomware infection. The ransomware will generate encrypted data, which is generally more random than non-encrypted data. Accordingly, an increase in the randomness of data being backed up may indicate a change in use or this may indicate malware or ransomware activity. In some implementations, the disaster recovery system 100 calculates the entropy (e.g., the Shannon Entropy) of recorded in each back-up. In some implementations, the disaster recovery system 100 compares the entropy of each back-up for a protected system to the entropy of previous back-ups for the protected system. In some implementations, the disaster recovery system 100 compares the entropy of each back-up for a protected system to the entropy of back-ups for similar protected systems, e.g., protected systems in the same profile (as described in more detail below).

Another indication of randomness is how consistent data is across systems. For example, similar computing systems will have identical files (e.g., operating system files or executable files for commonly installed software). In a block-based system, blocks of identical files may likewise be identical. In some implementations, as introduced above, a deduplication scheme is used to store a single instance of data corresponding to multiple protected systems. Related protected computing systems will have a percentage of their respective back-up data deduplicated. If one of the protected computing systems diverges from its related protected computing systems, i.e., if a lower percentage of its particular back-up data can be deduplicated, then that system is exhibiting a data storage pattern that is inconsistent. This may indicate a change in use or this may indicate malware or ransomware activity.

In some implementations, the disaster recovery system 100 maintains statistics for client systems fitting a profile, and the disaster recovery system 100 compares new statistics for a client system fitting the profile to the maintained historical statistics. The profile may describe characteristics of the client system such as a hardware configuration (e.g., a processor chipset), an operating system, a primary usage context (e.g., mobile, home-use, office-use, data server, etc.), a usage scope (e.g., single user, multi-user, data server, data storage, etc.), system deployment context, ownership (e.g., belonging to a same corporate enterprise), system deployment location, system deployment date (age), and so forth. For example, in some implementations, the disaster recovery system 100 maintains historical deduplication statistics for client systems fitting a profile, and the disaster recovery system 100 compares new data deduplication statistics for a client system fitting the profile to the maintained historical deduplication statistics.

At stage 630, the disaster recovery system 100 detects, from the analysis in stage 620, ransomware activity. The disaster recovery system 100 may detect ransomware activity based on one or more factors, each based on the analysis in stage 620. In some implementations, the factors indicate a probability of infection, and the disaster recovery system 100 detects ransomware activity when the probability of infection exceeds a threshold probability. In some implementations, the disaster recovery system 100 triggers an alarm when the probability of infection exceeds a threshold probability and, responsive to the alarm, a malware detection process is initiated to analyze the potentially infected protected system. In some implementations, the malware detection process is automated. For example, in some implementations, the disaster recovery system 100 uses the back-up data to create a virtualized instance of the protected system (e.g., in a sandbox environment) and then initiates a malware scan on the virtualized instance.

The disaster recovery system 100 may determine that one or more of the following factors indicates a probability of infection:

In some implementations, the disaster recovery system 100 detects ransomware activity by measuring new back-up data added to a system wide deduplication storage and determining, from the analysis in stage 620, that the amount of new back-up data added to the system, compared to historical deduplication statistics, indicates ransomware activity. In some implementations, the amount of new data indicates ransomware activity if the amount is a statistical outlier from the historical deduplication statistics. In some implementations, the amount of new data indicates ransomware activity if the amount exceeds an average amount (based on historical deduplication statistics) by at least a predetermined threshold. In some such implementations, the threshold is a percentage.

In some implementations, the disaster recovery system 100 detects ransomware activity by identifying an increase or change in types of file modification events. For example, if a protected system begins to create large new files at a faster rate than indicated by historical data for the protected system, or at a faster rate than peer protected system, the protected system may be infected. In some implementations, the disaster recovery system 100 detects deviation in file creation rates where a protected system outpaces its peers or its own history by more than a threshold percentage. In some implementations, the disaster recovery system 100 detects ransomware activity indicated by append file events where the malware may be adding new encrypted chunks to an encrypted file.

In some implementations, the disaster recovery system 100 detects ransomware activity by combining results from analysis of deduplication rates and analysis of file change events. For example, a decrease in deduplication combined with an increase in file creation or file append events may be correlative. In some implementations, the disaster recovery system 100 uses this information to identify specific changes and flag them as suspect. Similarly, in some instances, a malware system may change filenames or modify file storage metadata. In some implementations, the disaster recovery system 100 detects ransomware activity by combining results from analysis of deduplication rates and analysis of file metadata changes.

In some implementations, the disaster recovery system 100 detects ransomware activity by identifying an increase in randomness of data being backed-up. For example, the Shannon Entropy of encrypted data differs from data adhering to many commonly used file formats. The encrypted data is more random. Another, similar, indicator is if the compression ratio of data blocks changes. An incoming data block with structured data may be more compressible than an incoming data block that is less structured and more random.

In some implementations, the disaster recovery system 100 detects ransomware activity by identifying a change in the consistency between data being backed up for a computing system as compared to peer computing systems. For example, in an enterprise context, a percentage of the data on each computing system may be expected to be identical. If a computing system in this context diverges by more than a threshold percentage, this may indicate malware activity.

In some implementations, the disaster recovery system 100 detects ransomware activity at stage 630 using a predictive analytics based proactive detection. As the disaster recovery system 100 receives back up data, a predictive analytics engine analyzes the received back-up data and identifies anomalies (e.g., the anomalies described above). The predictive analytics engine looks for behaviors a protected system would exhibit if infected with ransomware.

In some implementations, the disaster recovery system 100 detects ransomware activity at stage 630 by scanning back up data for malware. The scan may include searching the data for malware fingerprints or signatures. In some implementations, the scan compares back up data to a catalog of known malware indicators. However, newer malware might not have entries in the catalog. In some implementations, the disaster recovery system 100 uses the predictive analytics approach described above to detect active malware and uses a catalog-based scanning approach to detect dormant malware. Newer malware might escape the dormant detection, but will be identified when it becomes active. In some implementations, the catalog is periodically updated and, on update, the disaster recovery system 100 rescans back-up data for evidence of new malware using the updated catalog. Furthermore, once active malware is detected, the catalog can be used to retroactively scan the back-up data to identify an infection point.

At stage 640, the disaster recovery system 100 identifies, from the recorded back-up data, an infection point. In some implementations, the infection point is a point in time (or span of time) after which the client system is infected with malware (e.g., the detected ransomware) and before which the client system is not infected with the malware. The infection point may be an exact time, a time span, a date, a period, etc. In some implementations, the infection point is a demarcation between back-up data in a series of back-up data, where the data before the demarcation is not infected and the data after the demarcation is (or may be) infected.

In some implementations, the disaster recovery system 100 identifies the infection point by scanning the back-up data for malware. In some implementations, the disaster recovery system 100 creates a virtualized clone of the protected client system using the back-up data (e.g., in a sandbox environment) and scans the virtualized clone for malware. For example, the disaster recovery system 100 may recover the protected client system to a known-good state prior to infection (e.g., a bookmarked known-good date) and scan the clone for malware. The disaster recovery system 100 then iteratively restores each incremental back-up and scans each increment for malware. Eventually the disaster recovery system 100 will recover an infected back-up. The infection point is therefore just prior to the infected back-up. The malware scan may detect malware that was previously undetected because the scan occurs after evidence of infection. This retroactive scan may benefit from more recent malware signature files. Further, because an infection is expected to be found, additional resources may be applied that might not be used during more day-to-day scans.

In some implementations, the disaster recovery system 100 may identify a hybrid set of data for use in recovery. The hybrid includes all data prior to the infection point plus some data backed-up after the infection, filtered such that only non-infected blocks are recovered. In some such implementations, the disaster recovery system 100 omits an infected block from the recovery while still recovering other non-infected blocks created after the infection point. This hybrid recovery reduces the amount of data lost to a malware infection.

At stage 650, the disaster recovery system 100 restores the client system to a state prior to the infection point. In some implementations, the disaster recovery system 100 notifies an administrator and the administrator controls a restoration process. For example, in some implementations, the disaster recovery system 100 implements the method 700 described below in reference to FIG. 7. In some implementations, the recovery is fully automatic. For example, in some implementations, if the probability of a ransomware exceeds a preconfigured threshold, then recovery is initiated without waiting for an administrative authorization.

In some implementations, the analysis at stage 630 is performed by an appliance local to the protected client device. For example, the analysis at stage 630, detecting the ransomware, may occur first on the protected client device itself, or on an appliance on the local network. In some such implementations, the local analysis triggers a second analysis at a remote server. For example, if the local analysis identifies a probability of infection above a first threshold, the local server may trigger a more in-depth analysis at the remote server. In some implementations, all of the analysis is at a remote server, e.g., in a cloud-based server. In some implementations, the resulting recovery at stage 650 uses back-up data that is held by the local appliance. In some implementations, the resulting recovery at stage 650 uses back-up data that is held remotely, e.g., in the cloud.

Figure 7:
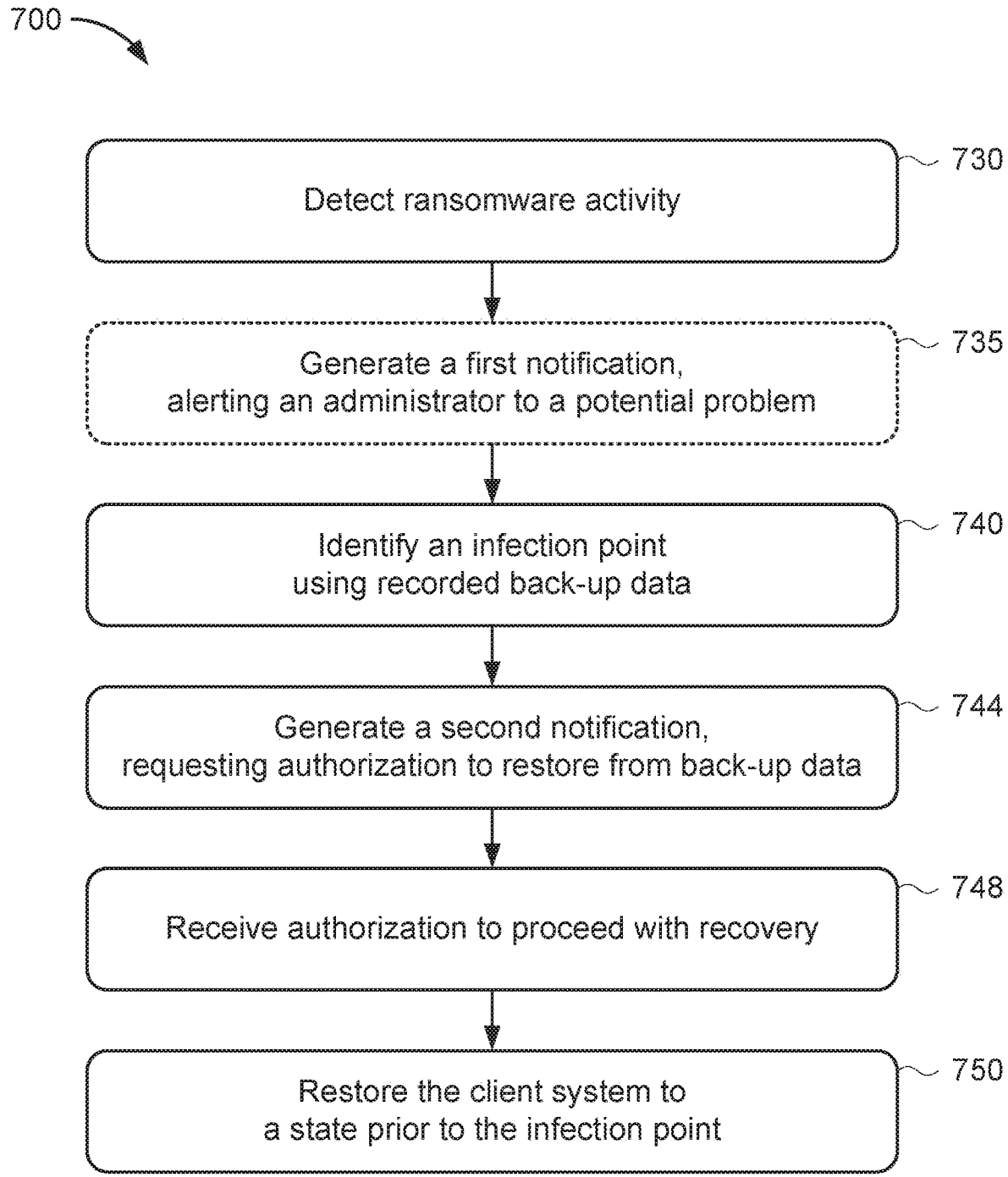
FIG. 7 is a flowchart for a method of notifying an administrator of ransomware detection for authorized recovery.

FIG. 7 is a flowchart for a method 700 of notifying an administrator of ransomware detection for authorized recovery. In brief overview of the method 700, at stage 730, the disaster recovery system 100 detects ransomware activity and, at stage 735, generates a first notification, alerting an administrator to a potential problem. At stage 740, the disaster recovery system 100 identifies an infection point using recorded back-up data and, at stage 744, generates a second notification, requesting authorization to restore from back-up data. At stage 748, the disaster recovery system 100 receives the requested authorization to proceed with recovery and, at stage 750, restores the client system to a state prior to the infection point.

Referring to FIG. 7 in more detail, at stage 730, the disaster recovery system 100 detects ransomware activity. For example, in some implementations, the disaster recovery system 100 detects ransomware activity as described above in reference to stage 630 of the method 600 illustrated in FIG. 6. In some implementations, the detection occurs at an appliance on premises, e.g., at an appliance on a network local to the infected client system. In some implementations, the detection occurs at an appliance off premises, e.g., at an appliance on a remote network such as a third-party cloud network remote from the infected client system.

At stage 735, the disaster recovery system 100 generates a first notification, alerting an administrator to a potential problem. For example, in some implementations, the disaster recovery system 100 generates and sends an e-mail or SMS text message to a preconfigured e-mail address or telephone number. In some implementations, the notification includes details such as a score indicating a probability of infection (or confidence score). In some implementations, the notification includes an actionable element (e.g., a hyperlink to a uniform resource locator ("URL")) for a webpage or interface that the notification recipient (e.g., an administrator) can use to learn more about the infection. In some implementations, the notification includes an actionable element that the administrator can use to initiate automated recovery. In some implementations, the notification includes an actionable element that the administrator can use to access an interface through which the administrator can learn more about the infection and initiate automated recovery. In some implementations, stage 735 is omitted or consolidated with stage 744 (e.g., only sending one notification instead of the two described in FIG. 7).

At stage 740, the disaster recovery system 100 identifies an infection point using recorded back-up data. For example, in some implementations, the disaster recovery system 100 identifies the infection point as described above in reference to stage 640 of the method 600 illustrated in FIG. 6.

At stage 744, the disaster recovery system 100 generates a second notification, requesting authorization to restore from back-up data. For example, in some implementations, the disaster recovery system 100 generates and sends an e-mail or SMS text message to a preconfigured e-mail address or telephone number. In some implementations, the notification includes details such as a score indicating a probability of infection (or confidence score), a date (or date and time) of the infection, and an amount of data that can be reliably recovered. In some implementations, the notification includes an actionable element (e.g., a hyperlink to a URL for a webpage or interface that the administrator can use to learn more about the infection. In some implementations, the notification includes an actionable element that the administrator can use to initiate automated recovery. In some implementations, the notification includes an actionable element that the administrator can use to access an interface through which the administrator can learn more about the infection and initiate automated recovery. In some implementations, the administrator can reply to the notification (e.g., by reply e-mail or reply SMS text) to authorize automated recovery.

At stage 748, the disaster recovery system 100 receives the requested authorization to proceed with recovery. For example, the disaster recovery system 100 may receive a request to a URL initiating or otherwise authorizing recovery. In some implementations, the disaster recovery system 100 provides an interface for controlling the recovery process. For example, the disaster recovery system 100 may provide a webpage (or website) where an administrator can be authenticated, can select data for inclusion or exclusion from the recover, and can initiate the recovery. In some implementations, the disaster recovery system 100 receives a reply to the notification (e.g., by reply e-mail or reply SMS text) authorizing automated recovery.

At stage 750, the disaster recovery system 100 restores the client system to a state prior to the infection point. For example, in some implementations, the disaster recovery system 100 restores the client system in the manner described above in reference to stage 650 of the method 600 illustrated in FIG. 6). In some implementations, the disaster recovery system 100 generates a third notification of a completed recovery.

Figure 8:
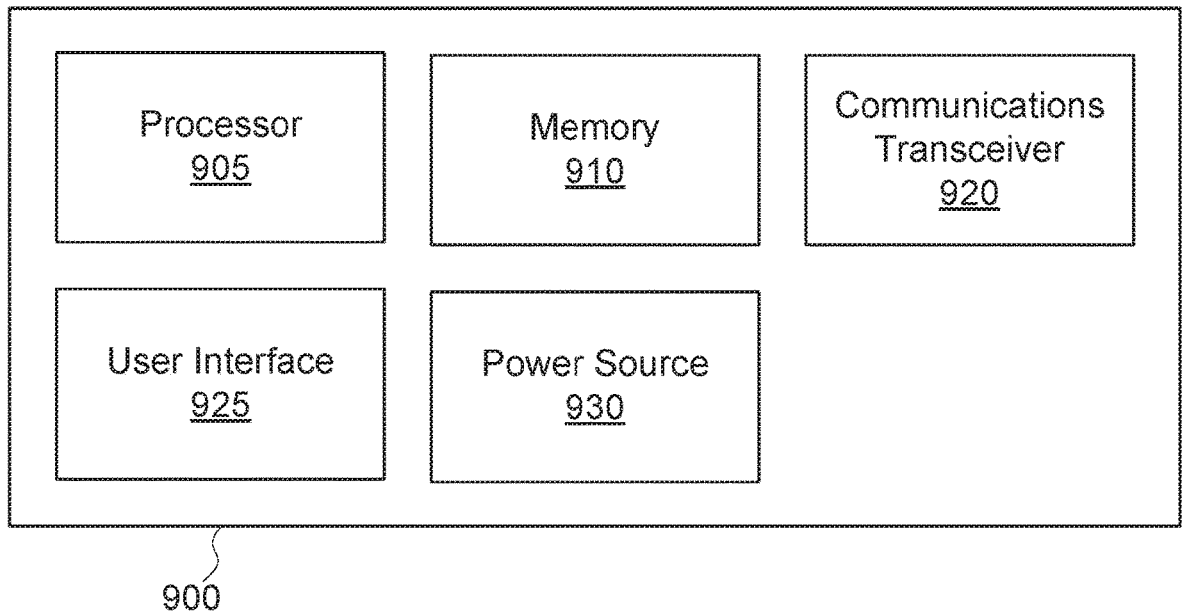
FIG. 8 is a block diagram of a computing device in accordance with an illustrative embodiment.

FIG. 8 is a block diagram of a computing device in accordance with an illustrative implementation. In some implementations, additional, fewer, and/or different elements may be used. A computing device 900 includes a processor 905, a memory 910, a communications transceiver 920, a power source 930, and a user interface 925. The disaster recovery system 100 can include one or more computing devices 900. For example, application server 105 can include an implementation of computing device 900, client computer 155 can include an implementation of computing device 900, cloud-based disk storage and virtual machine 180 can include an implementation of computing device 900, etc.

In some implementations, computing device 900 can include processor 905. Processor 905 can be configured to carry out and/or cause to be carried out one or more operations described herein. Processor 905 can execute instructions as known to those skilled in the art. The instructions may be carried out by one or more special purpose computers, logic circuits (e.g., programmable logic circuits (PLC)), and/or hardware circuits. Thus, processor 905 may be implemented in hardware, firmware, software, or any combination of these methods. The term "execution" is the process of running an application or the carrying out of the operation called for by an instruction. The instructions may be written using one or more programming languages, scripting languages, assembly languages, etc. Processor 905 executes an instruction, meaning that it performs the operations called for by that instruction. Processor 905 operably couples with memory 910, communications transceiver 920, power source 930, user interface 925, etc. to receive, to send, and to process information and to control the operations of the computing device 900. Processor 905 may retrieve a set of instructions from a permanent memory device such as a read-only memory (ROM) device and copy the instructions in an executable form to a temporary memory device that is generally some form of random access memory (RAM). Computing device 900 may include a plurality of processors that use the same or a different processing technology. In an illustrative implementation, the instructions may be stored in memory 910.

In some implementations, computing device 900 can include memory 910. Memory 910 can be an electronic holding place or storage for information so that the information can be accessed by processor 905 using any suitable method. Memory 910 can include, but is not limited to, any type of random access memory (RAM), any type of read-only memory (ROM), any type of flash memory, etc. such as magnetic storage devices (e.g., hard disk, floppy disk, magnetic strips, etc.), optical disks (e.g., compact disk (CD), digital versatile disk (DVD), etc.), smart cards, flash memory devices, solid state drives, etc. Computing device 900 may have one or more computer-readable media that use the same or a different memory media technology. Computing device 900 may have one or more drives that support the loading of a memory medium such as a CD, a DVD, a flash memory card, etc.

In some implementations, computing device 900 includes a communications transceiver 920. Communications transceiver 920 can be configured to receive and/or transmit information. In some implementations, communications transceiver 920 communicates information via a wired connection, such as an Ethernet connection, one or more twisted pair wires, coaxial cables, fiber optic cables, etc. In some implementations, communications transceiver 920 can communicate information via a wireless connection using microwaves, infrared waves, radio waves, spread spectrum technologies, satellites, etc. Communications transceiver 920 can be configured to communicate with another device using cellular networks, local area networks, wide area networks, the Internet, etc. In some implementations, one or more of the elements of computing device 900 communicate via wired or wireless communications.

In some implementations, computing device 900 includes power source 930. Power source 930 can be configured to provide electrical power to one or more elements of computing device 900. In some implementations, power source 930 can include an alternating power source, such as available line voltage (e.g., 120 Volts (V) alternating current at 60 Hertz in the United States). Power source 930 can include one or more transformers, rectifiers, etc. to convert electrical power into power useable by the one or more elements of computing device 900, such as 1.5 V, 8 V, 12 V, 24 V, etc. Power source 930 can include one or more batteries.

In some implementations, computing device 900 includes user interface 925. User interface 925 can be configured to receive and/or provide information from/to a user. User interface 925 can be any suitable user interface. User interface 925 can be an interface for receiving user input and/or machine instructions for entry into computing device 900 using any suitable method. User interface 925 may use various input technologies including, but not limited to, a keyboard, a stylus and/or touch screen, a mouse, a track ball, a keypad, a microphone, voice recognition, motion recognition, disk drives, remote computing devices, input ports, one or more buttons, dials, joysticks, etc. to allow an external source, such as a user, to enter information into computing device 900. User interface 925 can be used to navigate menus, adjust options, adjust settings, adjust display, etc. User interface 925 can be configured to provide an interface for presenting information from computing device 900 to external systems, users, or memory. For example, user interface 925 can include an interface for a display, a printer, a speaker, alarm/indicator lights, a network interface, a disk drive, a computer memory device, etc. User interface 925 can include a color display, a cathode-ray tube (CRT), a liquid crystal display (LCD), a plasma display, an organic light-emitting diode (OLED) display, etc.

In an illustrative implementation, any of the operations described herein can be implemented at least in part as computer-readable instructions stored on a computer-readable memory. Upon execution of the computer-readable instructions by a processor, the computer-readable instructions can cause a node to perform the operations.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," etc., mean plus or minus ten percent.

The foregoing description of illustrative implementations has been presented for purposes of illustration and of description. It is not intended to be exhaustive or limiting with respect to the precise form disclosed, and modifications and variations are possible in light of the above teachings or may be acquired from practice of the disclosed implementations. It is intended that the scope of the invention be defined by the claims appended hereto and their equivalents.

What is claimed is:

1. A method of managing a client system, comprising:
recording back-up data for the client system;
analyzing the recorded back-up data;

wherein analyzing the recorded back-up data comprises:
identifying an inconsistent data storage pattern based on a percentage of the back-up data being deduplicated, wherein the percentage of the back-up data being deduplicated diverges from computing systems related to the client system;
detecting, based on the analysis, malicious activity;
identifying, from the recorded back-up data, an infection point; and
restoring the client system to a state prior to the infection point, wherein the client system is restored based on snapshots in both cloud-based object storage and cloud-based block storage.

2. The method of claim 1, wherein the recording the back-up data for the client system is performed periodically.

3. The method of claim 1, wherein the malicious activity is ransomware activity.

4. The method of claim 1, wherein analyzing the recorded back-up data comprises:
calculating an entropy of at least one back-up in the recorded back-up data; and
comparing the entropy of the back-up for the client system to an entropy of previous back-ups for the client system.

5. The method of claim 1, wherein analyzing the recorded back-up data comprises:
identifying a predictable usage pattern for the back-up data for the client system; and determining a change in the predictable usage pattern based on the back-up data for the client system; and
detecting the malicious activity is based on the determined change in the predictable usage pattern.

6. The method of claim 1, wherein analyzing the recorded back-up data comprises:
calculating an entropy of at least one back-up in the recorded back-up data; and
comparing the entropy of the back-up for the client system to an entropy of back-ups for at least one similar client system.

7. A method of managing a client system, comprising:
analyzing a recorded back-up data for the client system;
wherein analyzing the recorded back-up data comprises:
identifying an inconsistent data storage pattern based on a percentage of the back-up data being deduplicated, wherein the percentage of the back-up data being deduplicated diverges from computing systems related to the client system;
identifying an infection point using the recorded back-up data analysis;
generating a notification requesting authorization to restore from back-up data;
receiving authorization to proceed with recovery; and
restoring the client system to a state prior to the infection point, wherein the client system is restored based on snapshots in both cloud-based object storage and cloud-based block storage.

8. The method of claim 7, further comprising generating a notification alerting an administrator to a potential problem.

9. The method of claim 7, further comprising moving portions of the snapshot of the cloud-based object storage to the cloud-based block storage based on at least one recovery time objective.

10. The method of claim 7, wherein detecting ransomeware activity comprises:
validating whether a file on the client system adheres to a file format designated for the file based at least in part on a file-type fingerprint; and
determining the file is non-conforming in response to the file not adhering to the file format designated for the file on the client system.

11. The method of claim 7, wherein detecting ransomeware activity comprises:
maintaining a history of file modifications for the client system; and
analyzing file modification events to compare event trends to the history of file modifications for the client system.

12. The method of claim 7, wherein detecting ransomeware activity comprises:
maintaining historical deduplication statistics for the client system; and
comparing new data deduplication statistics for the client system to the maintained historical deduplication statistics.

13. The method of claim 7, wherein detecting ransomeware activity comprises:
determining whether a probability of infection exceeds a threshold probability based on factors indicating a probability of infection.

14. The method of claim 7, wherein detecting ransomeware activity comprises:
maintaining historical deduplication data;
measuring an amount of new back-up deduplication data from the client system;
comparing the measured amount to historical deduplication data; and
determining ransomware activity in response to the measured amount being a statistical outlier from the historical deduplication data.

15. The method of claim 7, wherein detecting ransomeware activity comprises:
maintaining historical deduplication data;
measuring an amount of new back-up deduplication data from the client system;
comparing the measured amount to historical deduplication data; and
determining ransomware activity in response to the measured amount exceeding an average amount of the historical deduplication data by at least a predetermined threshold.

16. The method of claim 7, wherein detecting ransomeware activity comprises:
identifying an increase or change in types of file modification events corresponding to the client system.

17. The method of claim 7, wherein detecting ransomeware activity comprises:
identifying an increase in randomness of the recorded back-up data.

18. The method of claim 7, wherein detecting ransomeware activity comprises:
identifying a measure of consistency for the recorded back-up data; and
determining ransomware activity in response to a divergence of the recorded back-up data by more than the measure of consistency.

* * * * *